May 28, 1929. C. J. KEENAN ET AL Re. 17,303

PULP FORMING MACHINE

Original Filed Feb. 9, 1926 3 Sheets-Sheet 1

INVENTOR.
CHARLES J. KEENAN
EUGENE P. KENNEDY
GEORGE H. KIRSCH.
BY Townsend, Loftus & Abbott
ATTORNEYS.

May 28, 1929. C. J. KEENAN ET AL Re. 17,303

PULP FORMING MACHINE

Original Filed Feb. 9, 1926 3 Sheets-Sheet 2

INVENTOR.
CHARLES J. KEENAN
EUGENE P. KENNEDY
GEORGE H. KIRSCH.

BY Townsend, Loftus & Abbett
ATTORNEYS.

May 28, 1929. C. J. KEENAN ET AL Re. 17,303

PULP FORMING MACHINE

Original Filed Feb. 9, 1926 3 Sheets-Sheet 3

INVENTOR.
CHARLES J. KEENAN
EUGENE P. KENNEDY
GEORGE H. KIRSCH
BY Townsend, Loftus & Abbett
ATTORNEYS.

Reissued May 28, 1929. Re. 17,303

UNITED STATES PATENT OFFICE.

CHARLES J. KEENAN, EUGENE P. KENNEDY, AND GEORGE H. KIRSCH, OF SAN FRANCISCO, CALIFORNIA, ASSIGNORS TO ALASKA PULP AND PAPER COMPANY, A CORPORATION OF CALIFORNIA.

PULP-FORMING MACHINE.

Original No. 1,621,671, dated March 22, 1927, Serial No. 86,972, filed February 9, 1926. Application for reissue filed October 12, 1927. Serial No. 225,824.

This invention relates to a machine whereby articles such as paper cups, bottles, pie plates, berry baskets and the like may be formed from wet pulp or analogous material.

The object of the present invention is to generally improve and simplify the construction and operation of machines of the character described and particularly to provide a machine which is continuous in operation and in which the pulp is automatically applied to the molds, relieved of excess water, dried and finally ejected.

The invention more specifically stated embodies a machine of the rotary type having an annular rim composed of a series of molds. These molds are successively adapted to be submerged during continuous rotation in a pulp vat and are subjected to a suction action when a coating of pulp is to be applied. The machine is provided with means for trapping water admitted to the molds during the application of the pulp, it is provided with means for automatically draining the water from the molds, and it is further provided with means whereby the pulp may be dried on the molds and automatically ejected when dried.

One form which the invention may assume is exemplified in the accompanying drawings in which.

Figure 1:
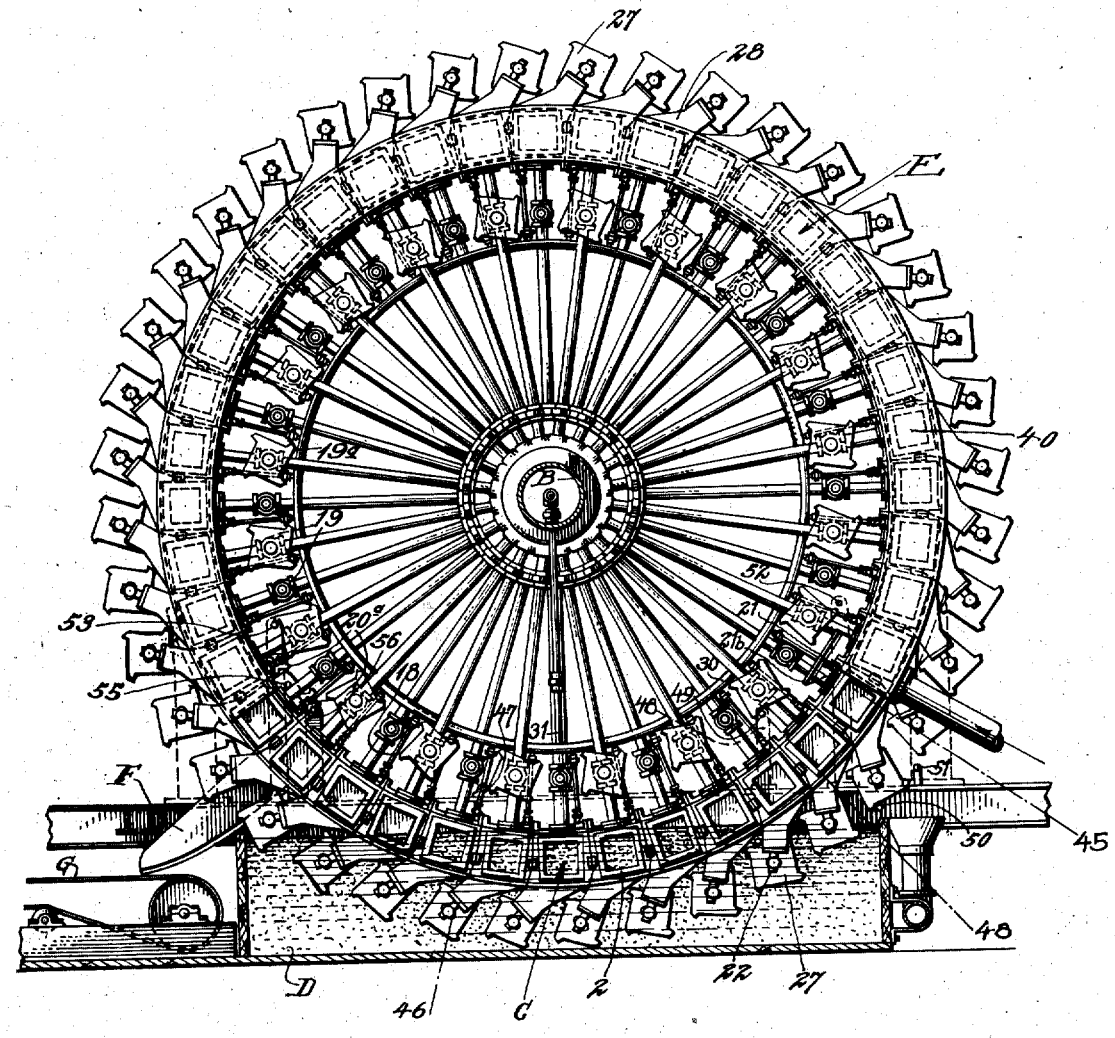
Fig. 1 is a side elevation of the machine partially in section.
Figure 2:
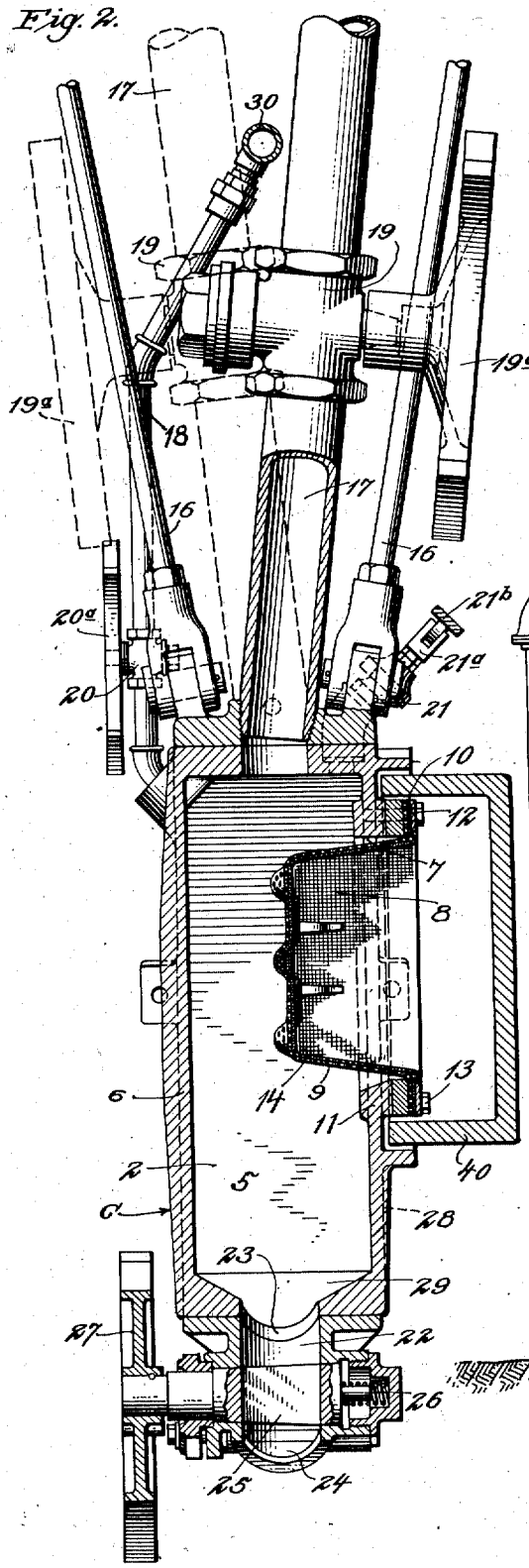
Fig. 2 is a central vertical cross section of the machine.

Referring to the drawings in detail and particularly to Figs. 1 and 2, A indicates a main frame in which is journalled a tubular shaft B. Carried by the shaft is an annular drum C, and carried by the drum is a plurality of molds upon which the pulp is adapted to be formed and dried. Disposed below the drum is a pulp receiving tank D into which pulp is continuously delivered from any suitable source.

Before rendering a detailed description of the several parts of the machine a brief description of the general operation will be submitted.

A continuous rotary motion is transmitted to the shaft B and the drum C carrying the molds and the molds are accordingly successively submerged in the pulp tank D. At the time of submersion in the pulp-containing tank D, a suction is applied to the molds and they are coated with a layer of pulp. Water enters the molds during the application of the pulp and the water is trapped to permit ready removal thereof. The suction is stopped after the layer of pulp has been applied and the trapped water is then drained off or removed, and the suction is again applied after the removal of the water.

The mold side of the drum is enclosed by a casing or housing E and a hot or warm air current is continuously circulated through the casing. The suction to which the drying molds are subjected causes the warm air to pass through the pulp and the molds and the pulp is thus dried directly on the molds and the completed pulp articles are finally discharged when the discharge chute F is reached. The pulp articles are here ejected by means of air under pressure and are finally removed by an endless conveyor belt G which carries the completed pulp articles to any point desired.

Figure 3:
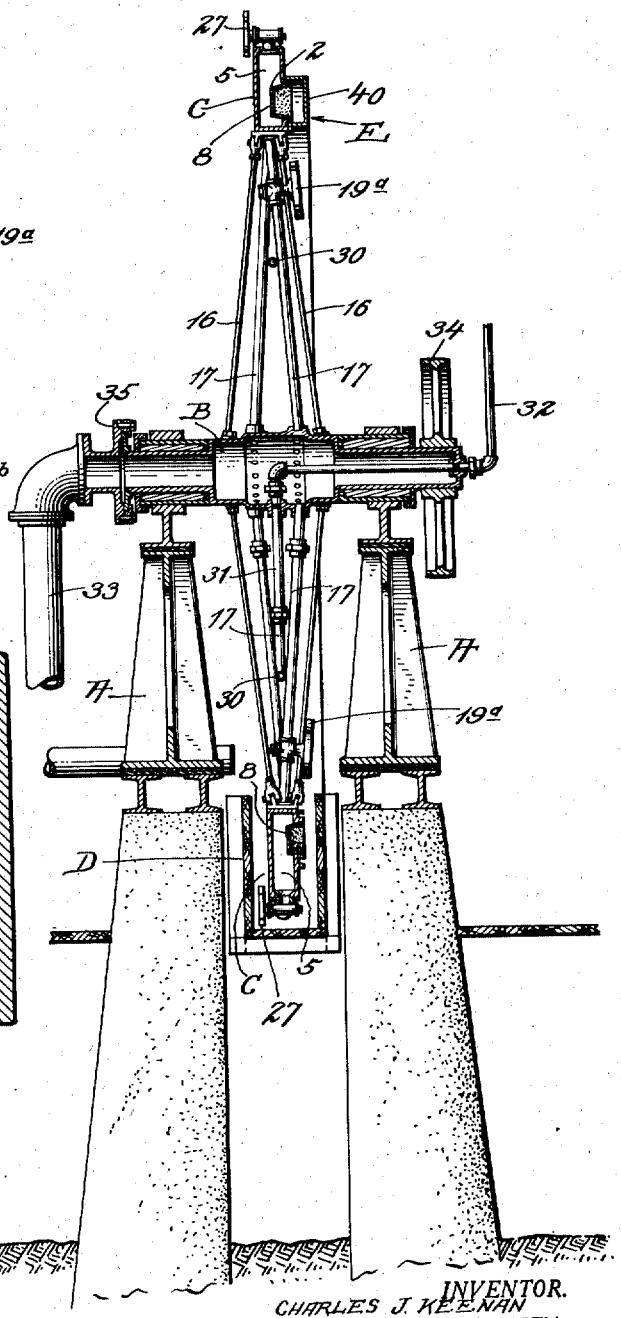
Fig. 3 is an enlarged detail cross section of one of the molds.
Figure 4:
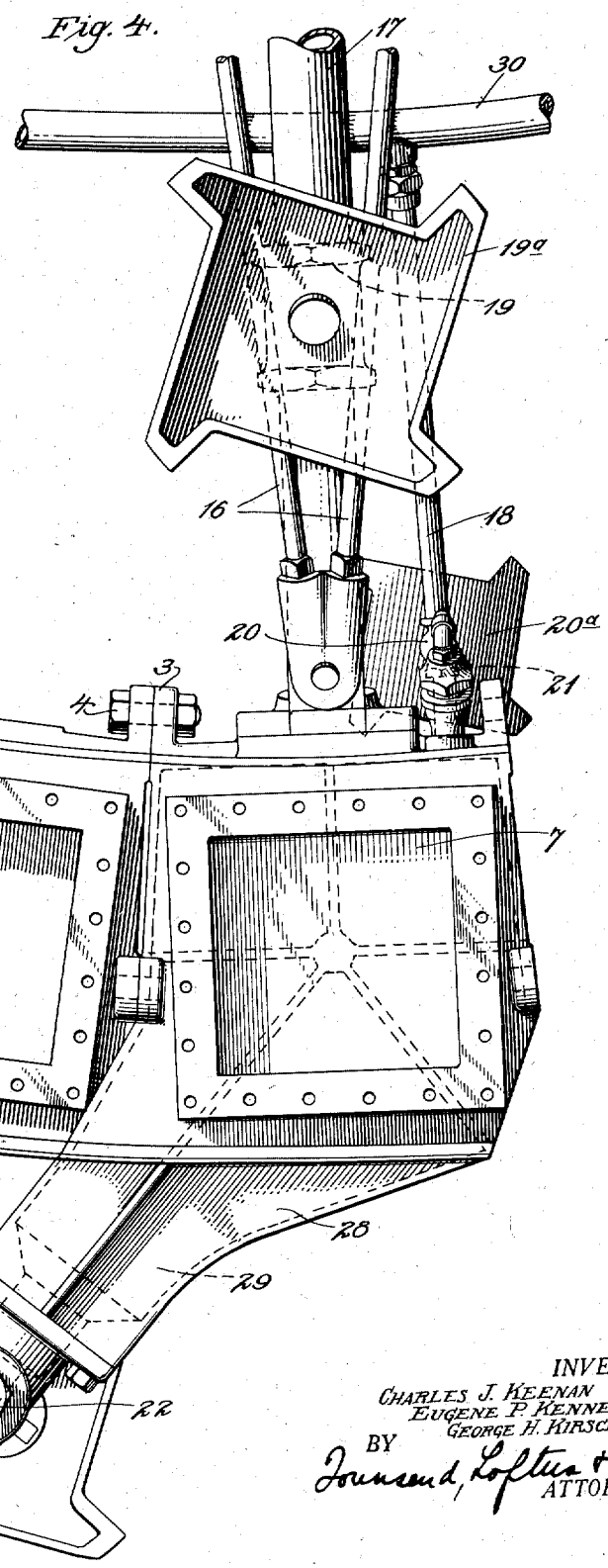
Fig. 4 is an enlarged side elevation of one of the molds.

A detailed description of the construction of the machine will now be submitted having particular reference to Figs. 1, 3 and 4. By referring to Fig. 1 it will be noted that the drum appears to consist of a number of substantially square-shaped casings. These casings are particularly illustrated in Figs. 3 and 4. They are indicated at 2 and are substantially square in outline. The several casings are connected to form the annular drum C by means of lugs 3 and bolts 4 and they are cored out to form interior chambers 5 which are intermittently subjected to a suction action and an air pressure as will hereinafter be described. The rear face of each casing is closed as indicated at 6 while the front faces are provided with openings 7 which are provided for the reception of the molds generally indicated at 8, there being one mold for each casing. Each mold consists of a perforated plate of metal 9 which is shaped to conform to the pulp article to be produced. In the present instance a berry basket is to be produced and the mold or perforated member 9 is accordingly square in shape and fairly deep. The perforated plate is provided with a flange 10 and the flange is held against the outer face 11 of the casing by means of a clamping plate 12 and bolts 13. The exterior surface of the perforated member 9 is covered with a fine screen material 14 and the pulp is formed on the surface thereof as will hereinafter be described.

The several casings forming the drum C are supported with relation to the hollow shaft B by means of tie rods or spokes 16. The several casings are also connected with the hollow shaft through means of suction pipes 17 and air pressure or blasting pipes 18, there being one suction pipe and one air blast pipe connected with each mold casing. The pipes 17 are provided with valves 19 so that the suction action on the molds may be controlled and the pipes 18 are similarly provided with valves 20 so that the air under pressure delivered to the mold casings may be controlled. Each mold casing is also provided with a venting valve 21 and each casing is also provided with a drain valve 22. The valves 19, 20 and 22 are identical in construction and they are operated in the same manner and it is accordingly thought that the detail description of one valve will suffice.

Figure 5:
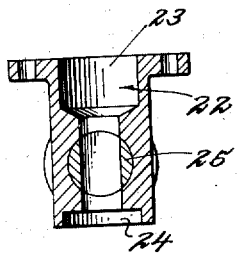
Fig. 5 is a cross-section of valve 22.

For instance, by referring to the drain valve indicated at 22 and by further referring to Figs. 3 and 5 it will be noted that it is nothing more or less than a two-way cock. The valve consists of a casing having an inlet opening 23 in communication with the chamber 5 of the casing and a discharge opening 24. A tapered cock 25 passes through the valve casing and it is held in tight engagement by means of a spring 26. The projecting end of the cock is provided with a star gear 27 and means are employed for imparting an intermittent rotary motion to the star gear and the cock 25 actuated thereby. Each casing 2 is provided with an extension 28 in which is formed a trap chamber 29. The valve 22 is disposed at the lower end of the chamber and the water collected therein is automatically drained off whenever the valve 22 is opened. The air pressure pipes 18 are all connected with an annular pipe 30 and this is in turn connected with a radially disposed pipe 31 which enters the tubular shaft B and which is connected with a pipe 32 extending through a stuffing box at one end thereof, pipe 32 being in turn connected with a source of air supply under pressure not here shown. The opposite end of the tubular shaft is connected with a suction pipe 33 and this is in turn connected with a vacuum pump or the like not here shown. The pipe 33 is stationary and as shaft B is continuously rotated through means of a pulley or other suitable means, such as shown at 34, a connection 35 is formed between the pipe and the end of the shaft B to prevent leakage. All of the pipes 17 are connected with the central portion of the shaft B and as this is in turn connected with a suction pipe 33 it is obvious that a suction will be produced in each casing 2 when the valves 19 are opened. The molds 8 are in the present instance arranged only on one side of the casings 2, but it is obvious that two sets of molds may be employed in conjunction with each casing if desired. In view of the fact that the molds are placed on the sides of the drum, an enclosing housing is not required. That is, the housing which delivers hot air or any other drying medium to the molds is arranged at one side only as indicated at 40. The housing extends from a point indicated at 45 to the discharge chute F. One end is connected with a hot air furnace or the like, not here illustrated, and hot air is thus continuously delivered to the housing and is drawn through the pulp and the molds which will hereinafter be described.

In actual operation it will be understood that the drum C is continuously rotated through means of the pulley 34 or other driving connection provided, and similarly, that pulp is continuously delivered to the vat D. During the continuous operation of the drum the casings 2 carrying the molds will be successively submerged in the vat and as a suction is applied to each mold during the period of submersion a coating of pulp will be applied. The suction valves 19 are provided with star wheel handles 19[a] and as they reach the point indicated at 46 they engage a stationary pin 47. The pin engaging with the star gear imparts a quarter revolution thereto and the suction valves are thus opened and they remain open until the point 48 is reached. See Fig. 1. The coating of pulp is applied during this portion of the revolution of the drum and a second pin 49 is then engaged which imparts another quarter revolution to the valves 19 thus closing off the suction connection. A pin 50 engages the star wheel handles 27 the moment the suction valves are closed, that is at the point 48 and the drain valves 22 are accordingly opened. The water admitted to the casings and trapped in the chambers 29 thereof is drained off during the open position of the valves 22 and the drain valves are closed when the point 51 is reached. Each casing as previously stated is provided with a venting valve 21. The venting valves are provided with plungers 21[a] which are engaged by a cam track 21[b]. This track extends from the point 48 to the point 51 and the venting valves are thus opened during the draining period. The venting valves are merely provided for the purpose of facilitating complete draining of the water admitted, or in other words, to prevent any vacuum formation within the casings during the draining period. The suction valves are engaged by a pin 52 when the point 45 is reached. That is, after the drain valves have been closed and the suction valves remain open until the point 53 is reached. The valves are here engaged by a pin which transmits a turning motion to close the valves. A second pin 55 engages the star wheel handles of the valves 20 at the same point and the valves delivering compressed air to the casings are thus opened. The pulp containers are now dry and as air pressure is admitted they are blown off the molds and discharged into the chute F and finally delivered to the conveyor belt G which removes the pulp containers from the machine. A second pin 56 is engaged by the star gear handles 20[a] and the air pressure valves are again closed. The pins 55 and 56 are close together and the air under pressure is only momentarily applied. The valves 20 are only opened and closed once during each revolution of the drum while the suction valves 19 are opened and closed a number of times. They are first opened at the point 46 when the molds are submerged. They are closed at the point 48 and remain closed until the point 45 is reached. They are here opened and remain open until the point 53 is reached. They are here closed and they remain closed until the point 46 is reached, when the cycle of operation is complete and a new cycle commences. The air pressure applying valves 20 and the drain valves 22 are merely opened and closed once during each revolution, the valves 20 being merely momentarily opened at the point 53 and then almost immediately closed, while the drain valves are opened at the point 48 and are closed at the point 51. From the foregoing it will be noted that the pulp is automatically applied during submersion of the molds, and that excess water is drained off after the application of the pulp. The pulp applied is dried during the passage of the molds through the casing 40, and the pulp articles when dried are automatically ejected by means of air under pressure when the discharge chute F is reached. The entire operation is continuous, a large capacity is possible, pulp articles of practically any shape desired may be obtained, such as berry baskets, pie plates, cups, bottles, etc ; a complicated mechanism is entirely obviated, as the pulp is applied directly on the mold, it is formed thereon, dried thereon, and finally automatically ejected.

While certain features of the present invention have been more or less specifically described and illustrated, we wish it understood that certain changes may be resorted to within the scope of the appended claims. We also wish it understood that the material and finish of the various parts employed may be such as the experience and judgment of the manufacturer may dictate or conditions may demand.

The thermal-efficiency or amount of heat required by a machine of this character is small when comparison is made with other machines. This is due to the fact that the housing or casing 40 is mounted on one side of the drum only. In other words no part of the drum enters the drying housing, but it merely runs in snug contact with one side of the drying housing, and, as the molds communicate with the drying housing, warm air is drawn through the molds and the only part of the housing which is subjected to the heat is that portion which supports the mold. Other types of machines have employed a drying housing, but in every instance of which we are aware, not only the molds enter the housing but also the mold supports or casings cooperating therewith. Such an arrangement is decidedly wasteful as the entire drum or mechanism becomes heated and is cooled again when the molds are submerged. Heating of the casings carrying the molds is entirely obviated in our structure and expansion and contraction of the drum formed by the mold housings is also obviated thereby eleminating expansion strains and stresses.

Having thus described our invention, what we claim and desire to secure by Letters Patent is:

1. In a machine of the character described, a mold mounted for movement through a pulp tank and a drying chamber, means for applying a layer of pulp to the mold while passing through the tank by subjecting the mold to a suction action, means for trapping water admitted to the mold during the application of the pulp and means for automatically draining off the water before the mold enters the drying chamber.

2. In a machine of the character described, a mold mounted for movement through a pulp tank and a drying chamber, means for applying the layer of pulp to the mold while passing through the tank by subjecting the mold to a suction action, said mold having a trap chamber formed therein for the collection of water admitted during the application of the pulp, a drain valve in communication with the trap chamber and means for automatically maintaining the valve open for a predetermined period before the mold enters the drying chamber to drain off the water collected in the trap.

3. In a machine of the character described, a mold mounted for movement through a pulp tank and a drying chamber, means for applying a layer of pulp to the mold while passing through the tank by subjecting the mold to a suction action, said mold having a trap chamber formed therein for the collection of water admitted during the application of the pulp, a drain valve in communication with the trap chamber, means for discontinuing the suction action when the coating of pulp has been applied, means for automatically opening the drain valve when the suction ceases to permit the water in the trap to drain away from the mold, means for automatically closing the valve after the water has been drained off and means for automatically subjecting the mold to a suction action when it enters the drying chamber.

4. In a machine of the character described, a mold mounted for movement through a pulp tank and a drying chamber, means for applying a layer of pulp to the mold while passing through the tank by subjecting the mold to a suction action, said mold having a trap chamber formed therein for the collection of water admitted during the application of the pulp, a drain valve in communication with the trap chamber, means for discontinuing the suction action when the coating of pulp has been applied, means for automatically opening the drain valve when the suction ceases to permit the water in the trap to draw away from the mold, means for automatically closing the valve after the water has been drained off, means for automatically subjecting the mold to a suction action when it enters the drying chamber, and means for automatically ejecting the dried pulp when the mold leaves the drying chamber.

5. In a machine of the character described, a mold mounted for movement through a pulp tank and a drying chamber, means for applying a layer of pulp to the mold while passing through the tank by subjecting the mold to a suction action, said mold having a trap chamber formed therein for the collection of water admitted during the application of the pulp, a drain valve in communication with the trap chamber, means for discontinuing the suction action when the coating of pulp has been applied, means for automatically opening the drain valve when the suction ceases to permit the water in the trap to drain away from the mold, means for automatically closing the valve after the water has been drained off, means for automatically subjecting the mold to a suction action when it enters the drying chamber, and means for admitting air under pressure to the mold when it leaves the drying chamber to eject the dried pulp.

6. In a machine of the character described a continuously rotating member, a plurality of molds mounted thereon, a pulp containing tank in which the molds are successively submerged during rotation of the member, means whereby each mold is subjected to a suction action while submerged to apply a coating of pulp, means for trapping water entering the molds during the application of the pulp, means for automatically draining off the water, a drying chamber cooperating with the rotary member and the molds carried thereby to which dry warm air is admitted, means for maintaining a suction on the molds after the water has been drained off and while the molds are passing through the drying chamber and means for automatically removing the pulp when dried.

7. In a machine of the character described, a drum consisting of a plurality of connected housings, each housing having a trap chamber formed therein, a mold carried by each housing, a suction pipe and an air pressure pipe connected with each housing, a valve on each pipe, a drain valve in communication with each trap chamber, means for transmitting a continuous rotary movement to the drum, a pulp tank cooperating with the drum and in which the housings carrying the molds are successively submerged during the continuous rotation of the drum, a housing cooperating with the drum to which warm dry air is delivered, a venting valve cooperating with each housing and mold, means for automatically opening the valves on the suction pipes when the molds are submerged to permit a coating of pulp to be applied to each mold, means for automatically closing said valves when the pulp is applied, means for automatically opening the venting valves and the drain valves to permit water which has entered the housings during the application of the pulp to be drained off, means for closing said valves after the water is drained off, means for again opening the suction valves when the molds enter the drying housing, means for again closing the suction valves when the pulp is dried and means for momentarily opening the valves on the air pressure pipes to cause automatic ejection of the dried pulp.

8. In a machine of the character described, a housing consisting of interspaced side walls, end walls and a top wall, one of the side walls having an opening formed therein for the reception of a mold, an extension on the lower end of the side and end walls forming a trap chamber and a drain valve in communication with the chamber.

9. In a machine of the character described, a housing consisting of interspaced side walls, end walls and a top wall one of the side walls having an opening formed therein for the reception of a mold, an extension on the lower end of the side and end walls forming a trap chamber and a drain valve in communication with the chamber, a suction pipe and an air pressure pipe in communication with the chamber, a valve on each pipe, and means for automatically opening and closing said valve and also the drain valve.

10. In a machine of the character described, a continuously rotating drum, a plurality of molds mounted on one side thereof, means for applying pulp to said molds and a channel-shaped housing arranged on one side of the drum and in communication with the molds to deliver hot air thereto.

11. In a machine of the character described, a rotor, a fixed mold thereon, means for applying a coating of pulp to the mold, means for drying said pulp while on the mold, means for maintaining a substantially continuous suction on the pulp from the time of application to the completion of the drying, and means for ejecting the pulp when dried.

12. In a machine of the character described, a rotor, a fixed mold thereon mounted for movement through a pulp tank and a drying chamber, means for maintaining a substantially continuous suction on the mold, first to apply a coating of pulp when the mold passes through the pulp tank, and secondly to draw warm air through the pulp and mold during the passage through the drying chamber so as to maintain a substantially continuous suction on the pulp fiber during the application and drying of the pulp, and means for ejecting the dried pulp when the mold leaves the drying chamber.

13. A pulp forming machine comprising a mold, means for causing said mold to travel through a pulp applying station, a drying station and an ejecting station, suction means for applying pulp directly to the mold from a bulk supply at the first-named station and for maintaining said applied pulp on the mold as it passes through said drying station, and means for applying air under pressure within the mold when it reaches the ejecting station to discharge a formed and dried article from the mold, whereby the pulp will remain undisturbed on the mold from its point of application and formation to the point of discharge of the finally formed and dried article.

14. A method of forming pulp articles which consists of applying pulp to a traveling mold, passing the mold through a drying chamber and maintaining the pulp on the mold and under constant and uniform suction during the entire drying operation.

15. A method of forming pulp articles which consists of applying pulp to a traveling mold, passing the mold through a drying chamber and maintaining the pulp on the mold and under constant and uniform suction during the entire drying operation, and then ejecting the molded pulp article when completely dried by applying an air pressure to the mold.

16. In a machine of the character described a rotor, a mold fixed thereto, a pulp tank in which the rotor is partially submerged, a drying chamber adjacent the rotor and partially surrounding the same, said mold passing through the pulp tank and the drying chamber once during each revolution of the rotor, a suction pump, a connection between the pump and the mold whereby suction is applied to the mold and whereby a coating of pulp is applied to the mold during its passage through the pulp tank, and warm air pulled through the pulp coating while the mold passes through the drying chamber so that the pulp will be dried, and means for applying compressed air to the mold to eject the pulp article after it is dried.

17. In a machine of the character described a rotor, a mold fixed thereto, a pulp tank in which the rotor is partially submerged, a drying chamber adjacent the rotor and partially surrounding the same, said mold passing through the pulp tank and the drying chamber once during each revolution of the rotor, a suction pump, a connection between the pump and the mold, a valve in the suction connection, said valve being automatically opened to apply suction to the mold, and automatically closed to close the suction connection, said suction when applied causing a coating of pulp to be formed on the mold during its passage through the pulp tank and warm air to be pulled through the pulp coating while the mold passes through the drying chamber so that the pulp article will be dried, a compressed air delivery pipe connected with the mold and an automatically actuated valve to deliver compressed air to the mold when the pulp is dried so as to eject the dried pulp article.

CHARLES J. KEENAN.
E. P. KENNEDY.
GEORGE H. KIRSCH.